Sept. 16, 1941.  W. A. BEATTY  2,256,336
PULSE MODULATION SYSTEM
Filed Jan. 9, 1940    2 Sheets-Sheet 1

Sept. 16, 1941.  W. A. BEATTY  2,256,336
PULSE MODULATION SYSTEM
Filed Jan. 9, 1940  2 Sheets-Sheet 2
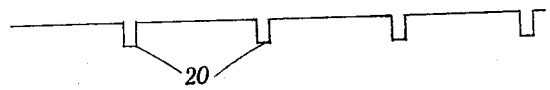
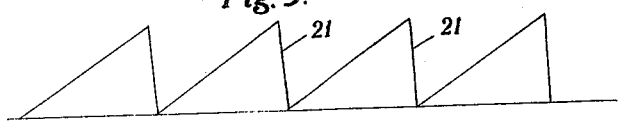
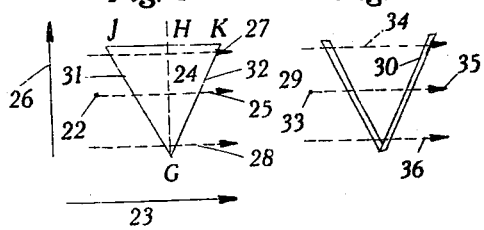
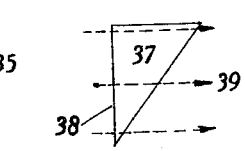
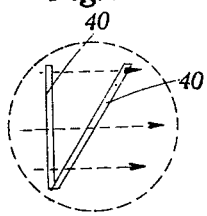
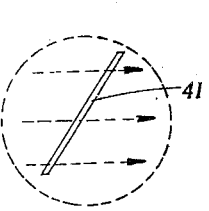
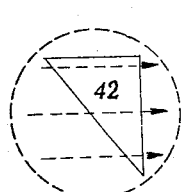
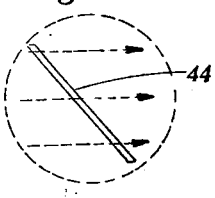
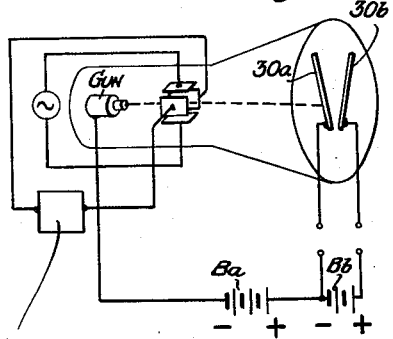
Inventor
W. A. Beatty
by
Attorney Patented Sept. 16, 1941

2,256,336

UNITED STATES PATENT OFFICE 2,256,336

PULSE MODULATION SYSTEM

William Arnold Beatty, Sidcup, Kent, England, assignor to International Standard Electric Corporation, New York, N. Y.

Application January 9, 1940, Serial No. 313,041
In Great Britain January 6, 1939

2 Claims. (Cl. 179—171.5)

In the copending application No. 212,731, filed June 9, 1938, by Alec Harley Reeves and assigned to the present assignee, International Standard Electric Corp., there are described various types of pulses used for methods of pulse modulation at a transmitter. The present invention deals with novel methods of generating such various types of pulses and generally with methods of generating pulse series the characteristics of which depend upon those of sound television or other continuous waves.

It is an object of my invention to provide means for producing pulses in pulse modulation systems.

It is a further object of my invention to provide simple apparatus for generating pulses whose duration or phase is a function of an intelligence signal.

Other objects of my invention are evident from the description in connection with the attached drawings wherein:

Figs. 2 and 3 illustrate synchronizing pulses and deflecting voltages employed in a pulse generation tube according to my invention;

Figs. 4–11 illustrate collector electrode configurations for use in a pulse generation tube.

Figure 1:
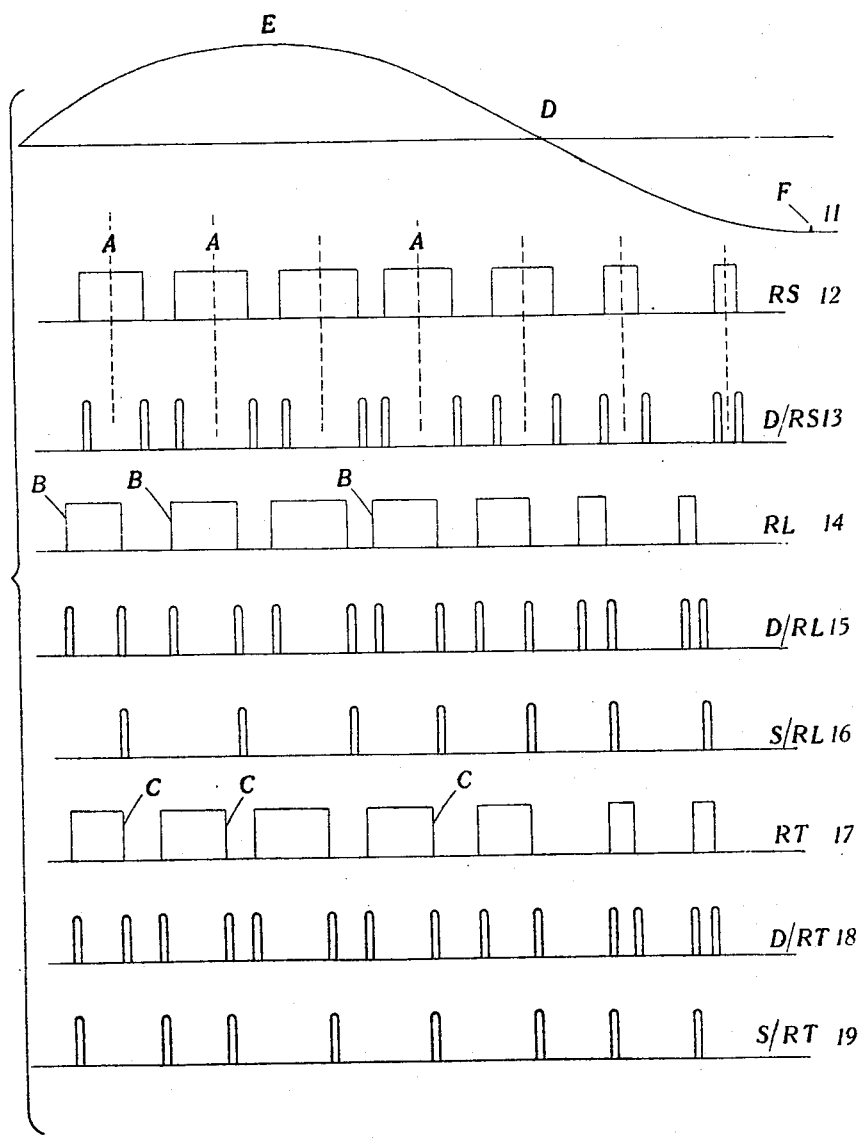
Fig. 1 illustrates types of pulses employed in pulse modulation systems.

In order to shorten the subsequent description, the various types of pulses mentioned in the above-mentioned copending application have been given identification codes. These are shown in Fig. 1 of the accompanying drawings.

In Fig. 1 curve 11 shows a portion of a sine wave. Curve 12 shows rectangular pulses with their centre points A spaced at equal time intervals, these pulses being coded RS (rectangular symmetrical). Curve 13 shows a double pulse arrangement of the pulses shown in curve 12 and these pulses are coded D/RS (double pulse rectangular symmetrical). Curve 14 shows rectangular pulses with their leading edges B spaced at equal time intervals, these pulses being coded RL (rectangular leading edge fixed). Curve 15 shows a double pulse arrangement of the pulses shown in curve 14, the pulses being coded D/RL (double pulse rectangular leading edge fixed). Curve 16 shows a double pulse arrangement as shown in curve 15 except that the leading edge pulses have been suppressed, these pulses have been coded S/RL (double pulse rectangular leading edge suppressed). Curve 17 shows rectangular pulses with their trailing edges C spaced at equal time intervals, these pulses being coded RT (rectangular trailing edge fixed). Curve 18 shows a double pulse arrangement of the pulses shown in curve 17, the pulses being coded D/RT (double pulse rectangular trailing edge fixed). Curve 19 shows a double pulse arrangement as shown in curve 18 except that the trailing edge pulses have been suppressed, these pulses have been coded S/RT (double pulse rectangular trailing edge suppressed).

Methods of generating the various types of pulses will now be described with reference to Figs. 2 to 11 of the accompanying drawings. Referring to Fig. 2, a train of square shaped pulses 20 is shown. The pulses have a duration equal to 5% of the total time between the commencement of successive pulses, and have a frequency equal to the desired pulse modulating frequency. These pulses can be generated by any known means. Fig. 3 shows a sawtooth wave form 21 derived by well known means, synchronisation being obtained from the pulses 20, Fig. 2.

Fig. 4 shows part of the assembly of an electron discharge device, which can be a deflection control valve or an electron multiplier of the type described in British Patent No. 519,653, accepted April 2, 1940. An electron beam is focussed to a spot 22, and under the influence of the sawtooth wave form 21 is deflected by means not shown in the direction 23. During the fly-back stroke the beam is suppressed by means of the pulses 20; methods of performing this type of suppression are well known. A plate or grid-like collector 24 is traversed by the beam 22, matters being so arranged that normally the beam scans the collector 24 in the direction indicated by the path 25. Further beam-deflecting means not shown are capable of deflecting the beam 22 in the directions 26 under the influence of an external signal, which for instance can be indicated by the curve 11, Fig. 1. The paths taken by the beam 22 under the influence of different values of signal are as follows: path 27 when the signal has the maximum value E of curve 11, path 25 when the signal has the value D of curve 11 and path 28 when the signal has the minimum value F of curve 11. It will thus be seen that the signals derived from the collector plate 24 are rectangular in shape and have a time function of amplitude. It can be arranged that the line GH divides the collector 24 into two similar and equal areas GHJ and GHK, and it will thus be seen that the centres of the derived pulses are spaced at equal time intervals, the pulses being of the type coded RS, Fig. 1.

It is desirable with pulse modulation that the intervals between successive pulses be made as small as possible when the pulses have a time function of maximum amplitude, and that the pulses have as short a duration as possible when they have a time function of minimum amplitude of the signal corresponding to the generated pulse. The above conditions can be achieved by making the top edge JK of the collector 24 of such a length that the beam 22 when scanning near the top edge along the path 27 takes the whole of the forward stroke of the sawtooth wave form period; short pulses having a time function of minimum amplitude can be obtained by arranging that the path 28 comes close to the apex G of the collector 24.

Pulses coded D/RS, Fig. 1 can be derived as follows: Referring to Fig. 5, a V-shaped collector has its edges 29 and 30 corresponding to the edges 31 and 32 of plate 24, Fig. 4. The beam 33, Fig. 5 corresponds to the beam 22, Fig. 4, and the paths 34, 35, 36, Fig. 5, correspond to the paths 27, 25, 28, Fig. 4 respectively.

Assuming similar operating conditions, as described for the plate 24, double pulses can be derived from the V-shaped collector, Fig. 5, the leading edges of the pulses coinciding with the leading and trailing edges of pulses RS derived from collector 24. It will thus be seen that the type of pulses codes D/RS, Fig. 1 can be derived from the V-shaped collector, Fig. 5.

The generation of the other types of pulses shown in Fig. 1 will now be readily understood from reference to Figs. 6–11, the same system of scanning being assumed in all cases.

Fig. 6 shows a collector 37 with the edge 38 arranged perpendicular to the linear scanning direction 39. It will be seen that the pulses derived from this collector will have their leading edges spaced at equal time intervals but will have a time function of amplitude as in the case of the RS pulses. It will be seen that the derived pulses are similar to the RL type pulses, Fig. 1. Fig. 7 shows a collector 40 of formation suitable for deriving the D/RL pulses of Fig. 1. The deriving of these pulses should now be obvious having regard to description of previous figures.

Fig. 8 shows a collector 41 suitable for deriving S/RL pulses. The collector 41 is similar to the collector 40 except that the vertical position has been omitted, the sloping portion only being retained. Assuming similar operating conditions, it will be seen that the fixed-time-interval leading-edge pulses are suppressed, the variable-time-interval trailing-edge pulses only being generated.

Figs. 9, 10 and 11 are similar to Figs. 6, 7 and 8, except that sloping edges of the collectors are reversed, being on the left side.

With similar scanning conditions to that already described, RT pulses can be derived from collector 42, Fig. 9, D/RT pulses from collector 43, Fig. 10 and S/RT pulses from collector 44, Fig. 11.

The arms of the V-shaped plates in Figs. 5, 7 and 10 may if desired be insulated from each other so that by the application of different potentials to the arm pulses of dissimilar amplitude may be derived from the arms.

For example, in Figure 5a is shown an arrangement using a target like that of Figure 5 except that the two arms 30a and 30b are insulated from each other. The circuit of arm 30a is connected to a current source Ba, while the circuit of arm 30b is connected to a source of higher potential Bb. By this arrangement, pulses of different amplitudes are developed in the respective circuits.

From the foregoing description it will now be obvious to those skilled in the art that by suitably shaping the collectors of the electron discharge device the generated pulses can have modified time functions of amplitude thus making it possible for a sine wave to be changed into a peaky wave at the receiving end, using methods of reception described in copending application No. 212,731.

Another method of generating the various types of pulses described is to substitute for the collectors of the electron discharge device a fluorescent screen such as is used on the end of cathode ray tubes. A mask with suitable apertures allows the light from the scanned screen to influence the cathode of a photo sensitive device preferably of the electron multiplier type, so arranged that its cathode picks up light from the screen. It can be seen that if the whole screen is masked except for apertures shaped similarly to the collectors illustrated in Figs. 4–11 pulses similar to those generated in the previous embodiments can be obtained.

What is claimed is:

1. In a signalling system employing an electron beam tube having a source of electrons, sets of deflecting plates, and a bi-part target of predetermined shape with the parts insulated from each other, the method of generating pulse signals which are a function of the instantaneous amplitude of an intelligence signal which comprises applying said intelligence signal to one set of deflecting plates, applying a voltage of predetermined wave form and of a substantially constant frequency to another set of said deflecting plates, the frequency of said voltage being higher than the highest frequency of said intelligence signal, intercepting said beam by said target after deflection by said plates, applying a potential to one part of the target and a different potential to the other part of the target whereby pulses of dissimilar amplitude are derived therefrom.

2. Apparatus for generating pulse signals which are a function of the instantaneous amplitude of an intelligence signal comprising an electron beam tube comprising a source of electrons, sets of deflecting plates, and a bi-part target whose effective shape determines the wave-form of said pulse signals with the parts insulated from each other, a source of intelligence signals connected to one set of said deflecting plates, a source of deflecting voltages of predetermined wave form and substantially constant frequency connected to another set of said plates, the frequency of said deflecting voltages being higher than the highest frequency of said intelligence signals, means to apply a potential to one part of the target, and means to apply a different potential to the other part of the target whereby pulses of dissimilar amplitude are derived therefrom.

WILLIAM ARNOLD BEATTY.